US012715994B2

(12) United States Patent
Chen et al.

(10) Patent No.: US 12,715,994 B2
(45) Date of Patent: Aug. 25, 2026

(54) SILICONE COMPOSITION

(71) Applicants: DOW GLOBAL TECHNOLOGIES LLC, Midland, MI (US); DOW SILICONES CORPORATION, Midland, MI (US)

(72) Inventors: Wenjie Chen, Shanghai (CN); Yifan Xu, Shanghai (CN); Hua Ren, Shanghai (CN); Fengyi Su, Shanghai (CN); Joseph Ronald Sootsman, Auburn, MI (US)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 672 days.

(21) Appl. No.: 18/267,820

(22) PCT Filed: Dec. 23, 2020

(86) PCT No.: PCT/CN2020/138587

§ 371 (c)(1),
(2) Date: Jun. 16, 2023

(87) PCT Pub. No.: WO2022/133794

PCT Pub. Date: Jun. 30, 2022

(65) Prior Publication Data

US 2024/0093031 A1 Mar. 21, 2024

(51) Int. Cl.
*C08L 83/04* (2006.01)
*C09J 183/04* (2006.01)

(52) U.S. Cl.
CPC ............ *C08L 83/04* (2013.01); *C09J 183/04* (2013.01); *C08L 2205/025* (2013.01)

(58) Field of Classification Search
CPC combination set(s) only.
See application file for complete search history.

(56) References Cited

U.S. PATENT DOCUMENTS 4,766,176 A * 8/1988 Lee .......................... C08J 3/241 528/31
6,361,716 B1 3/2002 Kleyer et al.
6,448,329 B1 9/2002 Hirschi et al.
12,122,935 B2 * 10/2024 Fukui .......................... C08J 5/18
2003/0107026 A1 * 6/2003 Fujiki .................. C08G 65/007 252/500
2012/0134714 A1 * 5/2012 Takeuchi ........... G03G 15/0818 399/176
2013/0272755 A1 * 10/2013 Takeuchi ............. C09D 175/06 399/286
2013/0343789 A1 * 12/2013 Motoda ................... F16C 13/00 492/53

FOREIGN PATENT DOCUMENTS

EP 0971367 A1 * 1/2000 ............... H01B 1/22
JP H1030059 A 2/1998

OTHER PUBLICATIONS

1 International Search Report for PCT/CN2020/138587 dated May 28, 2021, 3 pages.

* cited by examiner

*Primary Examiner* — Peter A Salamon
(74) *Attorney, Agent, or Firm* — Warner Norcross + Judd LLP

(57) ABSTRACT

A silicone composition comprising (A) an electrically conductive filler, (B) a polydiorganosiloxane polymer, (C) a polyorganohydrogensiloxane, (D) a hydrosilylation reaction catalyst, (E) a polymer additive, and optionally (F) a hydrosilylation reaction inhibitor has a low complex viscosity upon admixing and upon cure provides a high electrical conductivity and good electrical conductivity retention after heat aging.

15 Claims, No Drawings

SILICONE COMPOSITION

CROSS-REFERENCE TO RELATED APPLICATIONS

This application is the U.S. National Stage of and claims priority to International Application No. PCT/CN2020/138587 filed on 23 Dec. 2020, the contents of which is incorporated herein by reference.

FIELD OF THE INVENTION

The present invention is a silicone composition and an electrically conductive silicone adhesive produced from such composition.

INTRODUCTION

Silicone adhesives are useful in a variety of applications such as in automotive, electronic, construction, appliance, and aerospace industries. Due to inherent insulation properties of silicone resins, silicone compositions need to incorporate electrically conductive fillers to improve electrical performance of cured products made therefrom for electrically conductive applications such as electrically conductive adhesives and electromagnetic interference (EMI) shielding materials.

Increasing the amount of electrically conductive fillers can improve electrical conductivity of silicone adhesives, but the resulting highly filled silicone composition has increased cost and is difficult to achieve a desired low complex viscosity, for example, a formulation complex viscosity of 350,000 pascal-seconds (Pas) or less at room temperature (23±2 degrees Celsius (° C.)) when measured within 2 hours of mixing all components of the silicone composition together. Therefore, there is a continued need for silicone compositions affording silicone adhesives with improved electrical performance while maintaining the low complex viscosity for easy processability and application.

Moreover, electrically conductive metal fillers tend to oxidize over time and eventually become non-conductive. Silicone adhesives comprising such fillers generally show poor electrical stability at high temperatures (e.g., 80-150° C.), as indicated by a ten to hundred fold increase in volume resistivity (VR) when used at 80-125° C. for one month. Therefore, it is also challenging to reduce VR variation of silicone adhesives after heat aging for an extended period of time.

It is desirable to discover a silicone composition suitable for preparing electrically conductive adhesives without the aforementioned problems.

SUMMARY OF THE INVENTION

The present invention solves the problem of discovering a silicone composition without the aforementioned problems. The present invention provides a novel silicone composition comprising an electrically conductive filler (A), a polydiorganosiloxane polymer (B), a polyorganohydrogensiloxane (C), a hydrosilylation reaction catalyst (D), and a specific polymer additive (E), and optionally a hydrosilylation reaction inhibitor (F). The silicone composition has a complex viscosity of no more than 350,000 pascal-seconds (Pa·s) at room temperature (23±2° C.), as measured within 2 hours after mixing all components in the silicone composition. The silicone composition, upon curing, also provides a cured product such as a silicone adhesive having improved electrical conductivity, as indicated by a lower volume resistivity (VR) than cured products made from a similar silicone composition lacking only the polymer additive (E) (hereinafter "Incumbent Silicone Composition"). The silicone composition of the present invention may also afford good retention of electrical conductivity after heat aging, for example, the cured product of the silicone composition shows less VR variation after heat aging at 125° C. for 20 days or longer, as compared to those made from the Incumbent Silicone Composition. These properties above are measured according to the test methods described in the Examples section below.

In a first aspect, the present invention provides a silicone composition comprising, by weight based on the total weight of the silicone composition, (A) from 66% to 89% of an electrically conductive filler;

(B) from 5% to 40% of a polydiorganosiloxane polymer of formula (I),

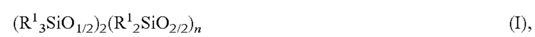

$$(R^1_3SiO_{1/2})_2(R^1_2SiO_{2/2})_n \quad (I),$$

where each $R^1$ is independently a monovalent aliphatic hydrocarbon group, n is in the range of from 35 to 1,000, and the polyorganosiloxane polymer contains an average of at least two alkenyl groups per molecule;

(C) a polyorganohydrogensiloxane of formula (II),

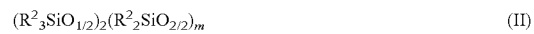

$$(R^2_3SiO_{1/2})_2(R^2_2SiO_{2/2})_m \quad (II)$$

where each $R^2$ is independently hydrogen or an alkyl group having from 1 to 20 carbon atoms, m is in the range of from 5 to 200, and the polyorganohydrogensiloxane has an average of at least three silicon-bonded hydrogen atoms per molecule;

(D) a hydrosilylation reaction catalyst;

(E) from 0.1% to 1.5% of a polymer additive having a molecular weight of greater than 2,000 to 20,000 grams per mole (g/mol), wherein the polymer additive is selected from the group consisting of a polypropylene glycol, an alcohol initiated ethylene oxide and propylene oxide copolymer, or mixtures thereof; and (F) from zero to 0.3% of a hydrosilylation reaction inhibitor.

In a second aspect, the present invention provides a process for preparing the silicone composition of the first aspect. The process comprises admixing the electrically conductive filler, the polydiorganosiloxane polymer, the polyorganohydrogensiloxane, the hydrosilylation reaction catalyst, the polymer additive, and the hydrosilylation reaction inhibitor if used.

In a third aspect, the present invention provides a silicone adhesive comprising a cured product of the silicone composition of the first aspect.

DETAILED DESCRIPTION OF THE INVENTION

The silicone composition of the present invention comprises one or more electrically conductive filler as component (A). "Electrically conductive filler" refers to any filler that exhibits an intrinsic resistivity of less than 1 Ohm-centimeter (Ω·cm) at 20° C. as determined by GB/T 351-2019 (China national standard for metallic materials-resistivity measurement method). The electrically conductive filler typically comprises particles having at least an outer surface of a metal selected from the group consisting of silver, gold, platinum, palladium, nickel, copper, or alloys thereof. The electrically conductive filler may comprise particles consisting of silver, gold, platinum, palladium, nickel, copper, or alloys thereof; preferably, silver. Alternatively, the electrically conductive filler may comprise particles having only an outer surface consisting silver, gold, platinum, palladium, or alloys thereof; and a core that is different from the outer surface (also referred to as "metal-coated particles"). The core of such particles can be any material, electrical conductor or insulator, that supports the outer surface and does not adversely affect electrical properties of silicone adhesives made from the silicone composition (i.e., cured products of the silicone composition). Examples of such materials for the core include copper, graphite, aluminum, glass such as solid glass or hollow glass, mica, nickel, or ceramic fiber. Preferably, the electrically conductive filler comprises silver-coated particles. The electrically conductive filler may include, for example, silver coated nickel particles, silver coated aluminum particles, silver coated copper particles, silver coated glass particles, or mixtures thereof. The silver-coated particles typically have a silver content of 1% or more, 2% or more, 3% or more, 4% or more, 5% or more, 6% or more, 7% or more, 8% or more, 9% or more, 10% or more, 11% or more, or even 12% or more, and at the same time, 60% or less, 55% or less, 50% or less, 45% or less, or even 40% or less, by weight based on the weight of the silver-coated particles, as determined by inductively coupled plasma mass spectrometry (ICP-MS).

The electrically conductive filler useful in the present invention typically have the form of a powder with the shape of flakes, rods, fibers, or spherical or other irregular shape. The electrically conductive filler useful in the present invention may include fillers prepared by treating the surfaces of the aforementioned particles with at least one organosilicon compound. Suitable organosilicon compounds include those typically used to treat silica fillers, such as organochlorosilanes, organosiloxanes, organodisilazanes, organoalkoxysilanes, or mixtures thereof. The electrically conductive filler can be a single electrically conductive filler as described above or a mixture of two or more such fillers that differ in at least one of the following properties: composition, surface area, surface treatment, particle size, and particle shape.

The electrically conductive filler useful in the present invention may have a median particle size of from 0.5 micron (μm) or more, 1 μm or more, 5 μm or more, 10 μm or more, 15 μm or more, 20 μm or more, 25 μm or more, 30 μm or more, 35 μm or more, or even 40 μm or more, and at the same time, 100 μm or less, 90 μm or less, 80 μm or less, 75 μm or less, 70 μm or less, 65 μm or less, 60 μm or less, or even 50 μm or less. "Median particle size" in the present invention refers to a D50 particle size as measured according to the test method described in the Examples section below.

Methods of preparing electrically conductive fillers suitable for use in the silicone composition of the present invention are well known in the art. For example, powders of silver, gold, platinum, or palladium, or alloys thereof are typically produced by chemical precipitation, electrolytic deposition, or cementation. Flakes of the aforementioned metals are typically produced by grinding or milling the metal powder. Particles having only an outer surface of at least one of the metals described above are typically produced by metallizing an appropriate core material using a method such as electrolytic deposition, electroless deposition, or vacuum deposition. When the electrically conductive filler is a filler prepared by treating the surfaces of the particles with the organosilicon compound, the particles can be treated prior to admixture with the other ingredients of the silicone composition or the particles can be treated in situ during the preparation of the silicone composition.

The electrically conductive filler in the silicone composition of the present invention may be present in an amount to give the silicone composition with desired viscosities and impart electrical conductivity to the silicone adhesives produced from the silicone composition. The desired complex viscosity of the silicone composition is typically 350,000 Pa·s or less at room temperature (23±2° C.) when measured within 2 hours of mixing all components of the silicone composition together, as determined according to the test method described in the Examples section below. The concentration of the electrically conductive filler depends on the desired electrical properties, surface area of the filler, density of the filler, shape of the filler particles, surface treatment of the filler, and nature of the other components in the silicone composition. The electrically conductive filler may be present in an amount of 66% or more, 69% or more, 70% or more, 70% or more, 71% or more, or even 72% or more, and at the same time, 89% or less, 88% or less, 87% or less, 86% or less, 85% or less, 84% or less, 83% or less, or even 82% or less, by weight based on the total weight of the silicone composition.

The electrically conductive filler useful in the present invention can be selected from one or a combination of more than one of these following three types of electrically conductive fillers: (a1) silver coated nickel particles, (a2) silver coated aluminum particles, and (a3) silver coated glass particles. For example, the silver coated nickel particles (a1) may be present in an amount of zero or more, 35% or more, 40% or more, 45% or more, 50% or more, or even 55% or more, and at the same time, 89% or less, 88% or less, 87% or less, 86% or less, 85% or less, 84% or less, or even 83% or less, by weight based on the total weight of the silicone composition. The silver coated aluminum particles (a2) may be present in an amount of zero or more, 15% or more, 18% or more, 20% or more, 22% or more, 25% or more, or even 27% or more, and at the same time, 82% or less, 80% or less, 78% or less, 73% or less, 70% or less, 68% or less, or even 66% or less, by weight based on the total weight of the silicone composition. The silver coated glass particles (a3) may be present in an amount of zero or more, 15% or more, 20% or more, 25% or more, 30% or more, 40% or more, 50% or more, 60% or more, 70% or more, or even 72% or more, and at the same time, 82% or less, 80% or less, 78% or less, 76% or less, even 73% or less, by weight based on the total weight of the silicone composition.

The silicone composition of the present invention also comprises one or more polydiorganosiloxane polymer as component (B). The polydiorganosiloxane polymer has formula (I),

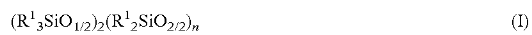

$$(R^1_3SiO_{1/2})_2(R^1_2SiO_{2/2})_n \qquad (I)$$

where each $R^1$ is independently a monovalent aliphatic hydrocarbon group, n is in the range of from 35 to 1,000, and the polyorganosiloxane polymer contains an average of at least two alkenyl groups per molecule.

The value of n in formula (I) may be 35 or higher, 50 or higher, 100 or higher, 150 or higher, 200 or higher, 250 or higher, or even 300 or higher, and at the same time, 1,000 or lower, 900 or lower, 800 or lower, 700 or lower, 650 or lower, or even 600 or lower.

Suitable monovalent aliphatic hydrocarbon groups may include alkyl groups and alkenyl groups. "Alkyl" means a cyclic, branched, or unbranched, saturated monovalent hydrocarbon group. The alkyl groups represented by $R^1$ typically have from 1 to 20 carbon atoms, from 1 to 12 carbon atoms, from 1 to 10 carbon atoms, from 1 to 6 carbon atoms, from 1 to 3 carbon atoms, or from 1 to 2 carbon atoms. Examples of suitable alkyl groups include methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. Preferred alkyl is methyl. "Alkenyl" means a branched or unbranched, monovalent hydrocarbon group having one or more carbon-carbon double bonds. The alkenyl groups represented by $R^1$ typically have from 2 to 10 carbon atoms, from 2 to 8 carbon atoms, or from 2 to 6 carbon atoms. Examples of suitable alkenyl groups include vinyl, allyl, propenyl (e.g., isopropenyl, and/or n-propenyl); and butenyl, pentenyl, hexenyl, and heptenyl, (including branched and linear isomers of 4 to 7 carbon atoms); and cyclohexenyl. Preferably, the alkenyl group is vinyl. The alkenyl groups in the polydiorganosiloxane polymer may be located at terminal, pendant, or both terminal and pendant positions. Preferably, at least 50 mol %, 60 mol % or more, 70 mol % or more, or even 80 mol % or more of the monovalent aliphatic hydrocarbon groups represented by $R^1$ are methyl. Mole percentage of methyl herein can be determined by nuclear magnetic resonance (NMR) analysis. The polydiorganosiloxane polymer useful in the present invention may include, for example, $ViMe_2SiO(Me_2SiO)_nSiMe_2Vi$, $ViMe_2SiO(Me_2SiO)_{0.98n}(MeViSiO)_{0.02n}SiMe_2Vi$, and $Me_3SiO(Me_2SiO)_{0.95n}(MeViSiO)_{0.05n}SiMe_3$, where Me and Vi denote methyl and vinyl, respectively, and n is as defined above.

Examples of suitable polydiorganosiloxane polymers include b1) dimethylvinylsiloxy-terminated polydimethylsiloxane, b2) dimethylvinylsiloxy-terminated poly(dimethylsiloxane/methylvinylsiloxane), b3) dimethylvinylsiloxy-terminated polymethylvinylsiloxane, b4) trimethylsiloxy-terminated poly(dimethylsiloxane/methylvinylsiloxane), b5) trimethylsiloxy-terminated polymethylvinylsiloxane, b6) dimethylvinylsiloxy-terminated poly(dimethylsiloxane/methylvinylsiloxane), b7) dimethylvinylsiloxy-terminated poly(dimethylsiloxane/methylphenylsiloxane), b8) dimethylvinylsiloxy-terminated poly(dimethylsiloxane/diphenylsiloxane), b9) phenyl,methyl,vinyl-siloxy-terminated polydimethylsiloxane, b10) dimethylhexenylsiloxy-terminated polydimethylsiloxane, b11) dimethylhexenylsiloxy-terminated poly(dimethylsiloxane/methylhexenylsiloxane), b12) dimethylhexenylsiloxy-terminated polymethylhexenylsiloxane, b13) trimethylsiloxy-terminated poly(dimethylsiloxane/methylhexenylsiloxane), b14) trimethylsiloxy-terminated polymethylhexenylsiloxane, b15) dimethylhexenylsiloxy-terminated poly(dimethylsiloxane/methylhexenylsiloxane), b16) dimethylvinylsiloxy-terminated poly (dimethylsiloxane/methylhexenylsiloxane), or combinations thereof. Preferably, the polydiorganosiloxane polymer is selected from the group consisting of b1) dimethylvinylsiloxy-terminated polydimethylsiloxane, b2) dimethylvinylsiloxy-terminated poly(dimethylsiloxane/methylvinylsiloxane), or a combination of b1) and b2).

The polydiorganosiloxane polymers are known in the art and may be prepared by methods such as hydrolysis and condensation of the corresponding organohalosilanes or equilibration of cyclic polydiorganosiloxanes.

The polydiorganosiloxane polymer can be a single polydiorganosiloxane or a mixture comprising two or more polydiorganosiloxanes that differ in at least one of the following properties: structure, average molecular weight, siloxane units, and sequence.

The polydiorganosiloxane polymer useful in the present invention may be present in the silicone composition, by weight based on the total weight of the silicone composition, in an amount of 5% or more, 6% or more, 7% or more, 7.5% or more, 9% or more, 10% or more, 12% or more, 15% or more, 18% or more, or even 20% or more, and at the same time, 40% or less, 38% or less, 35% or less, 32% or less, 30% or less, 28% or less, or even 25% or less.

The silicone composition of the present invention comprises one or more polyorganohydrogensiloxane as component (C). The polyorganohydrogensiloxane has formula (II),

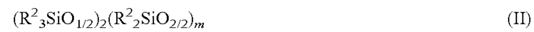

$$(R^2{}_3SiO_{1/2})_2(R^2{}_2SiO_{2/2})_m \quad \text{(II)}$$

where each $R^2$ is independently hydrogen or an alkyl group, m is in the range of from 5 to 200, and the polyorganohydrogensiloxane has an average of at least three silicon-bonded hydrogen atoms (SiH) per molecule. The alkyl group represented by $R^2$ may have from 1 to 20 carbon atoms, from 1 to 12 carbon atoms, from 1 to 10 carbon atoms, from 1 to 6 carbon atoms, from 1 to 3 carbon atoms, or from 1 to 2 carbon atoms, including, for example, methyl, ethyl, propyl, and butyl.

The value of m in formula (II) may be 5 or higher, 7 or higher, 10 or higher, 20 or higher, 30 or higher, 40 or higher, or even 50 or higher, and at the same time, 200 or lower, 150 or lower, 140 or lower, 130 or lower, 120 or lower, 110 or lower, or even 100 or lower.

The polyorganohydrogensiloxane useful in the present invention may comprise the silicon-bonded hydrogen atoms in an amount of 0.38% or more, 0.5% or more, 0.6% or more, or even 0.75% or more, and at the same time, 2% or less, 1.9% or less, 1.8% or less, 1.75% or less, 1.7% or less, or even 1.6% or less, by weight based on weight of the polyorganohydrogensiloxane. The content of silicon-bonded hydrogen atoms can be determined by NMR analysis.

Methods of preparing polyorganohydrogensiloxanes, such as hydrolysis and condensation of organohydridohalosilanes, are well known in the art. Examples of suitable polyorganohydrogensiloxanes include c1) trimethylsiloxy-terminated poly(dimethyl/methylhydrogen)siloxane, c2) trimethylsiloxy-terminated polymethylhydrogensiloxane, c3) dimethylhydrogensiloxy-terminated polydimethylsiloxane, c4) dimethylhydrogensiloxy-terminated poly(dimethylsiloxane/methylhydrogensiloxane, c5) dimethylhydrogensiloxy-terminated polymethylhydrogensiloxane, c6) a resin consisting essentially of $H(CH_3)_2SiO_{1/2}$ units and $SiO_{4/2}$ units, or combinations thereof.

The polyorganohydrogensiloxane is present in an amount sufficient to provide a molar ratio of silicon-bonded hydrogen atoms in the polyorganohydrogensiloxane to alkenyl groups in all components of the silicone composition (including alkenyl groups in the polydiorganosiloxane polymer (B) and other components that contain alkenyl groups if used, such as polyorganosilicate resin (G) described below), referred to as the SiH/Vi ratio, of from 0.5 to 10, for example, from 0.7 to 8, from 0.8 to 7, from 0.9 to 6, from 1 to 5, or from 1.05 to 2. The silicone composition typically comprises the polyorganohydrogensiloxane in an amount of 0.2% or more, 0.3% or more, 0.4% or more, 0.5% or more, and at the same time, 2% or less, 1.8% or less, 1.6% or less, 1.5% or less, or even 1.2% or less, by weight based on the total weight of the silicone composition.

The silicone composition of the present invention comprises one or more polymer additive as component (D). The polymer additive is selected from the group consisting of a polypropylene glycol (PPG), an alcohol initiated ethylene oxide and propylene oxide copolymer (hereinafter "alcohol initiated EO/PO copolymer"), or mixtures thereof.

The polymer additive useful in the present invention may have an average number of hydroxyl groups per molecule of 2 or more, 2.1 or more, 2.5 or more, or even 3 or more, and at the same times, 12 or less, 10 or less, 8 or less, or even 6 or less.

Preferably, the polymer additive useful in the present invention comprises one or more alcohol initiated EO/PO copolymer. The alcohol initiated EO/PO copolymer can be a linear or branched random copolymer.

The alcohol initiated EO/PO copolymer useful in the present invention may have the structure of formula (III):

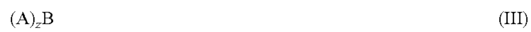

$$(A)_zB \quad \text{(III)}$$

where A represents HO—$(CHR^p—CHR^q—O)_x—(CH_2—CH_2—O)_y$—, wherein x is from 8 to 40, y is from 1 to 20, and $R^p$ and $R^q$ are different and selected from hydrogen and —$CH_3$; z is from 1 to 12; and B is hydrogen or a monovalent, bivalent, or multivalent hydrocarbon group having from 3 to 18 carbon atoms.

The sequence of the ethylene oxide units (—$CH_2CH_2$—O)—) and propylene oxide units (—($CH_2CHCH_3$—O)—) in segment A of formula (III) may be random or may be oriented in block configurations of any kind such as a single block of ethylene oxide units and a single block of propylene oxide units.

In formula (III), x and y are the average number of propylene oxide units and ethylene oxide units, respectively. The value of x can be from 8 to 40, from 10 to 35, from 15 to 30, or from 20 to 28. The value of y can be from 1 to 20, from 1 to 18, or from 1 to 16.

In formula (III), z can be from 1 to 12, from 2 to 10, from 3 to 8, or from 4 to 6.

In formula (III), the value of (x+y+z) is sufficient to give the alcohol initiated EO/PO copolymer a molecular weight as described below.

In formula (III), B may have from 3 to 18 carbon atoms, 3 or 12 carbon atoms, from 3 to 10 carbon atoms, from 3 to 8 carbon atoms, or from 4 to 6 carbon atoms.

When B is a monovalent or bivalent hydrocarbon group, formula (III) represents a linear structure. When B is a multivalent (e.g., trivalent or higher valent) hydrocarbon group, formula (III) represents a branched structure. B can be a group derived from sorbitol as follows,

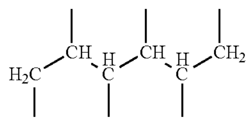

Alternatively. B can be a group derived from glycerol as follows,

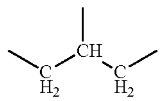

The alcohol initiated EO/PO copolymer useful in the present invention can be prepared from an alcohol initiator having 3 carbon atoms or more, 4 carbon atoms or more, 5 carbon atoms or more, or even 6 carbon atoms or more, and at the same time typically 18 carbon atoms or less, 12 carbon atoms or less, 10 carbon atoms or less, 8 carbon atoms or less, or even 6 carbon atoms or less. The alcohol initiator can be linear or branched alcohol and preferably, a branched alcohol. The alcohol initiator can be a mono, diol, triol, tetrol, pentol or hexol. Preferably, the alcohol initiator is a hexol. Preferably, the alcohol initiator for preparing the EO/PO copolymer is sorbitol, glycerol, or mixtures thereof. Methods and conditions used for the preparation of the alcohol initiated EO/PO copolymer are known to those skilled in the art, for example, at temperatures ranging from 20 to 180° C. or from 100 to 160° C. Preparation of the alcohol initiated EO/PO copolymer may be found in, for example, J. Herzberger et al., "Polymerization of ethylene oxide, propylene oxide, and other alkylene oxides: synthesis, novel polymer architectures, and bioconjugation," Chemical Reviews, Volume 116, Issue No. 4, pages 2170-2243 (2016).

The alcohol initiated EO/PO copolymer useful in the present invention may comprise, by weight based on the weight of the alcohol initiated EO/PO copolymer, the propylene oxide units (also as propylene oxide chains) in an amount of 50% or more, 52% or more, 55% or more, 58% or more, 60% or more, 62% or more, or even 65% or more, at the same time, 99% or less, 98% or less, 97% or less, 96% or less, or even 95% or less.

The polymer additive useful in the present invention has a molecular weight of greater than 2,000 g/mol, for example, 2,100 g/mol or more, 2,200 g/mol or more, 2,300 g/mol or more, 2,500 g/mol or more, 2,600 g/mol or more, 2,700 g/mol or more, 2,800 g/mol or more, 2,900 g/mol or more 3,000 g/mol or more, 3,200 g/mol or more, 3,500 g/mol or more, 3,800 g/mol or more, 4,000 g/mol or more, 4,500 g/mol or more, 5,000 g/mol or more, 5,500 g/mol or more, 6,000 g/mol or more, 6,500 g/mol or more, 7,000 g/mol or more, 7,500 g/mol or more, 8,000 g/mol or more, or even 9,000 g/mol or more, at the same time, 20,000 g/mol or less, 19,000 g/mol or less, 18,000 g/mol or less, 17,000 g/mol or less, 16,000 g/mol or less, 15,000 g/mol or less, 14,000 g/mol or less, 13,000 g/mol or less, 12,000 g/mol or less, 11,000 g/mol or less, or even 10,000 g/mol or less. Molecular weight herein refers to number average molecular weight ($M_n$) and is calculated by (56100*f)/OHV, where f represents an average number of hydroxyl groups per molecule of the polymer additive (also referred as "OH functionality"), and OHV represents hydroxyl value of the polymer additive in the units of mg KOH/g as determined by ASTM D4274-2011.

The silicone composition of the present invention may comprise the polymer additive in an amount of 0.1% or more, 0.12% or more, 0.15% or more, 0.18% or more, 0.2% or more, 0.22% or more, 0.25% or more, 0.28% or more, or even 0.3% or more, and at the same time, 1.5% or less, 1.4% or less, 1.3% or less, 1.2% or less, 1.1% or less, 1% or less, 0.9% or less, 0.8% or less, or even 0.7% or less, by weight based on the total weight of the silicone composition.

The silicone composition of the present invention comprises one or more hydrosilylation reaction catalyst as component (E). The hydrosilylation reaction catalyst can promote the addition reaction of component (B) with component (C). Hydrosilylation reaction catalysts may include platinum group metal catalysts. Such hydrosilylation reaction catalysts may comprise (e1) a metal selected from platinum, rhodium, ruthenium, palladium, osmium, and iridium, preferably, platinum; (e2) a compound of such a metal including, for example, chloridotris(triphenylphosphane)rhodium(I) (Wilkinson's Catalyst), a rhodium diphosphine chelate such as [1,2-bis(diphenylphosphino)ethane] dichlorodirhodium or [1,2-bis(diethylphospino)ethane] dichlorodirhodium, chloroplatinic acid (Speier's Catalyst), chloroplatinic acid hexahydrate, or platinum dichloride, (e3) a complex of the platinum group metal compound with a low molecular weight organopolysiloxane, (e4) the platinum group metal compound microencapsulated in a matrix or core-shell type structure, or a combination thereof, (e5) the complex microencapsulated in a resin matrix, or a combination thereof. Complexes of platinum with low molecular weight organopolysiloxanes include 1,3-diethenyl-1,1,3,3-tetramethyldisiloxane complexes with platinum (Karstedt's Catalyst). Exemplary hydrosilylation reaction catalysts are described in U.S. Pat. Nos. 3,159,601 and 3,220,972.

The concentration of the hydrosilylation reaction catalyst is sufficient to catalyze hydrosilylation reaction of silicon-bonded hydrogen atoms and alkenyl groups. Typically, the concentration of the hydrosilylation reaction catalyst is sufficient to provide 1 part per million (ppm) or more, 5 ppm or more, 10 ppm or more, 20 ppm or more, or even 30 ppm or more, at the same time, 6,000 ppm or less, 5,000 ppm or less, 4,000 ppm or less, 3,000 ppm or less, 2,000 ppm or less, 1,000 ppm or less, 500 ppm or less, 100 ppm or less, or even 50 ppm or less, of a platinum group metal, by weight based on the total weight of the silicone composition.

The silicone composition of the present invention may comprise one or more hydrosilylation reaction inhibitor (inhibitor) as component (F) that may optionally be used for altering rate of reaction of the silicon-bonded hydrogen atoms and the alkenyl groups in the silicone composition, as compared to reaction rate of the same starting materials but with the inhibitor omitted. Examples of suitable inhibitors include acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; or combinations thereof.

The hydrosilylation reaction inhibitor useful in the present invention may be present in the silicone composition in an amount of zero or more, 0.01% or more, 0.02% or more, 0.03% or more, 0.05% or more, or even 0.1% or more, and at the same time, 0.3% or less, 0.25% or less, 0.2% or less, or even 0.15% or less, by weight based on the total weight of the silicone composition.

The silicone composition of the present invention may comprise one or more polyorganosilicate resin as component (G). The polyorganosilicate resin comprises monofunctional units ("M" units) of formula $R^M{}_3SiO_{1/2}$ and tetrafunctional silicate units ("Q" units) of formula $SiO_{4/2}$, where each $R^M$ is independently alkyl or alkenyl. The alkyl groups represented by $R^M$ typically have from 1 to 6 carbon atoms or from 1 to 3 carbon atoms. Examples of alkyl groups include methyl, ethyl, propyl, pentyl, hexyl, and cyclohexyl. The alkenyl groups represented by $R^M$ typically have from 2 to 6 carbon atoms. Examples of alkenyl groups include, vinyl, allyl, butenyl, and hexenyl. Preferably, the alkyl group is methyl and the alkenyl group is vinyl.

The polyorganosilicate resin useful in the present invention typically consists essentially of the $R^M{}_3SiO_{1/2}$ units and $SiO_{4/2}$ units. "Consists essentially of" means a combined amount of M units and Q units in the polyorganosilicate resin is 98% or more, by weight based on the total weight of polyorganosilicate resin. The polyorganosilicate resin also contains $HOSiO_{3/2}$ units (TOH units), which account for the silicon-bonded hydroxyl content of the polyorganosilicate resin. The silicon-bonded hydroxyl content of the polyorganosilicate resin, as determined by NMR analysis, is typically less than 2% or less than 1%, by weight based on the total weight of the polyorganosilicate resin. The polyorganosilicate resin may contain a neopentamer organopolysiloxane having the formula $(R^MSiO)_4Si$, a by-product in the preparation of the resin according to the method of Daudt et al., described in U.S. Pat. No. 2,676,182, which is hereby incorporated by reference to teach how to make polyorganosilicate resins.

The mole ratio of M units to Q units in the polyorganosilicate resin is typically in the range of from 0.5 to 1.5, from 0.65 to 1.3, or from 0.8 to 1.2, as determined by NMR analysis. The M/Q ratio represents the total number of M units to the total number of Q units in the polyorganosilicate resin and includes contributions from any neopentamer if present.

The polyorganosilicate resin useful in the present invention may contain an average of 3 mol % or more, 4 mol % or more, or even 5 mol %, and at the same time, 20 mol % or less, 17 mol % or less, or even 15 mol % or less, of alkenyl groups. The mole percentage of alkenyl groups in the resin is defined here as the ratio of the number of moles of alkenyl-containing siloxane units in the resin to the total number of moles of siloxane units in the resin, multiplied by 100%. The total number of moles of siloxane units in the resin includes the M, Q, and TOH units described above, which can be determined by NMR analysis.

A preferred polyorganosilicate resin is a resin consisting essentially of $CH{=}CH(CH_3)$ 2 $SiO_{1/2}$ units, $(CH_3)$ 3 $SiO_{1/2}$ units, and $SiO_{4/2}$ units, wherein the mole ratio of M units (including $CH{=}CH(CH_3)$ 2 $SiO_{1/2}$ units and $(CH_3)$ 3 $SiO_{1/2}$ units) to Q units (i.e., $SiO_{4/2}$ units) is 0.8, and the resin contain 5 mol % and 1.8% by weight of vinyl groups. Weight percentage of vinyl groups in the resin, as determined by NMR analysis, is defined here as the total molar weight of vinyl groups in the resin relative to the molecular weight of the resin, multiplied by 100%.

The silicone composition of the present invention may comprise one or more adhesion promoter as component (H). The adhesion promoter may comprise an alkoxysilane including an unsaturated or epoxy-functional alkoxysilane, a combination (i.e., physical blend and/or a reaction product) of an alkoxysilane and a hydroxy-functional polyorganosiloxane, or mixtures thereof. Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane, or mixtures thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, or mixtures thereof.

Preferably, the adhesion promoter is a reaction product and/or a blend of the epoxy-functional alkoxysilane with a hydroxy-terminated polyorganosiloxane such as a hydroxy-terminated vinyl polyorganosiloxane. The adhesion promoter may include a combination (i.e., a physical blend and/or a reaction product) of 3-glycidoxypropyltrimethoxysilane and a hydroxy-terminated vinyl polydimethylsiloxane, preferably, a blend and/or a reaction product of 3-glycidoxypropyltrimethoxysilane and a hydroxy-terminated methylvinyl/dimethylsiloxane copolymer. Suitable commercially available adhesion promoters may include, for example, SYL-OFF™ 297, SYL-OFF™ 397, and SYL-OFF™ SL 9250 all available from Dow Silicones Corporation of Midland, Michigan, USA (SYL-OFF is a trademark of Dow Silicones Corporation).

The adhesion promoter useful in the present invention may be present in the silicone composition in an amount of zero or more, 0.01% or more, 0.05% or more, 0.1% or more, or even 0.5% or more, and at the same time, 5% or less, 4.5% or less, 4% or less, 3.5% or less, 3% or less, 2.5% or less, 2% or less, 1.5% or less, or even 1% or less, by weight based on the total weight of the silicone composition.

In addition to the components described above, the silicone composition of the present invention may further comprise one or more of the following additives: fillers other than electrically conductive fillers, pigments, and antioxidants. These additives may be present in the silicone composition in a total amount of from zero to 0.5%, from 0.01% to 0.2%, or from 0.05% to 0.15%, by weight based on the total weight of the silicone composition.

The silicone composition of the present invention can be prepared by admixing components (A) through (E) and (F) if used, and any optional components described above, typically at room temperature. The silicone composition can be a one-part composition or a multi-part composition. Mixing of the components in the silicone composition can be accomplished by any of the techniques known in the art such as milling, blending, and stirring, either in a batch or continuous process. The silicone composition can be prepared without the aid of a solvent while still achieving a desired low complex viscosity. Thus, the silicone composition of the present invention can be solventless (i.e., contain no solvent or may contain trace amounts of residual solvent from delivery of components in the silicone composition). "Low complex viscosity" herein refers to a complex viscosity of the silicone composition being 350,000 Pa·s or less at room temperature when measured within 2 hours of mixing all components of the silicone composition together, for example, a complex viscosity of 1,000 Pa·s or more, 1,500 Pa·s or more, 2,000 Pa·s or more, and at the same time, 350,000 Pa·s or less, 200,000 Pa·s or less, 100,000 Pa·s or less, 20,000 Pa·s or less, 15,000 Pa·s or less, or even 10,000 Pa·s or less, as measured according to the test method described in the Examples section below. The silicone composition of the present invention is typically stored in a sealed container to prevent exposure to air and moisture. The silicone composition of the present invention may be stored at room temperature for several weeks without any change in the properties of a cured product made from the silicone composition (e.g., a silicone adhesive), or at a temperature below 0° C., preferably from −30 to −20° C. for several months. The silicone composition of the present invention may be more stable than a similar silicone composition lacking only the polymer additive (E) (i.e., Incumbent Silicone Composition). For example, the silicone composition of the present invention shows no bleed out of oil-like liquids on the surface (i.e., no glossy surface) observed by the naked eye, after storage at room temperature for 3 months or longer.

The silicone composition of the present invention is useful for a range of applications, for example, the silicone composition cures to form electrically conductive adhesives, electrically conductive coatings, electromagnetic interference (EMI) shielding materials, release coatings, moldmaking compounds; protective coatings for electronic circuitry, planar surfaces, fibers or small particles, or gasketing materials. The silicone composition is a curable composition. Upon curing, the silicone composition forms a cured product with a high electrical conductivity. "High electrical conductivity" herein is indicated by a volume resistivity of 0.01 ohm·cm or less, preferably, 0.001 ohm·cm or less, more preferably, 0.0001 ohm·cm or less, as measured according to GB/T 1552-1995 (China national standard test method for measuring resistivity of monocrystal silicon and germanium with a collinear four-probe array). The silicone composition of the present invention is particularly useful for preparing an electrically conductive silicone adhesive.

The present invention also relates to a silicone adhesive comprising a cured product of the silicone composition, i.e., a silicone adhesive formed by curing the silicone composition via hydrosilylation reaction. The silicone adhesive may be used to form an adhesive article on a substrate by applying the silicone composition to the substrate. Applying the silicone composition to the substrate can be performed by various means including, for example, dispensing, spinning a thin film coating, jetting, spraying, dipping, pouring, screen printing, extrusion or by the use of a brush, roller or coating bar. The substrate can be any material that can withstand the curing conditions described below used to cure the silicone composition to form the silicone adhesive on the substrate. Suitable substrates may include, for example, epoxies, polycarbonates, poly(butylene terephthalate) resins, polyamide resins and blends thereof, such as blends of polyamide resins with syndiotactic polystyrene, acrylonitrile-butadiene-styrenes, styrene-modified poly (phenylene oxides), poly(phenylene sulfides), vinyl esters, polyphthalamides, polyimides, silicon, aluminum, stainless steel alloys, titanium, copper, nickel, silver, gold, or combinations thereof, preferably, the substrate that can be used in electronic applications. For example, the present invention can provide an electronic device comprising the substrate and the silicone composition or the silicone adhesive, disposed on the substrate. Curing the silicone composition may be conducted at room temperature or at elevated temperatures up to 200° C., for example, from 70 to 200° C., from 125 to 175° C., for a time sufficient to cure the silicone composition (e.g., 1 to 3 hours). Compared with the Incumbent Silicone Composition, the silicone composition of the present invention cures to form the silicone adhesive having an improved electrical conductivity, as indicated by a lower volume resistivity. For example, the silicone adhesive made from the silicone composition of the present invention can demonstrate a decrease of volume resistivity (VR) by at least 50% of the VR of silicone adhesives made from the Incumbent Silicone Composition, for example, a VR decrease by at least 60%, at least 70%, at least 80%, at least 90%, at least 95%, or even at least 99%. The silicone adhesive of the present invention can show a high electrical conductivity as described above. The silicone adhesive of the present invention may also exhibit better retention of these electrical properties upon thermal cycling at 125° C. for at least 20 days, 30 days or longer, or even 60 days or longer. For example, the VR variation of the silicone adhesive of the present invention may show a decrease by at least 50%, at least 60%, at least 70%, at least 80%, at least 90%, at least 95%, or even at least 99% of the VR variation of the silicone adhesives made from the Incumbent Silicone Composition.

The present invention also provides a method of bonding a first substrate to a second substrate. The method comprises (i) applying the silicone composition to the surface of at least one of the substrates, (ii) contacting the two substrates with the silicone composition residing therebetween, and (iii) curing the silicone composition. The two substrates are those as described above and can be the same or different. Curing the silicone composition can be conducted as described above.

EXAMPLES

Some embodiments of the invention will now be described in the following Examples, wherein all parts and percentages are by weight unless otherwise specified. The following materials are used in the examples:

Electrically conductive fillers, available from Potters Industries, include:

CONDUCT-O-FIL TH SN08P40 silver coated nickel granule particles (particle size: 8 μm, 40 wt % silver content), CONDUCT-O-FIL SN40P18 silver coated nickel granule particles with particle size of 40 μm (18 wt % silver content), CONDUCT-O-FIL S3000S3N silver coated glass spherical particles (particle size: 34 μm, 12 wt % silver content), and CONDUCT-O-FIL SA300S20 silver coated aluminum granule particles (particle size: 40 μm, 20 wt % silver content) (CONDUCT-O-FIL is a trademark of Potters Industries, Inc.).

1-Ethynyl-1-cyclohexanol (ETCH), available from TCI, is used as an inhibitor.

Inhibitor A, available from TCI, is 3,5-Dimethyl-1-hexyn-3-ol.

Pt (platinum) catalyst, available from Gelest, is SIP6831.2 platinum-divinyltetramethyldisiloxane complex, 2% Pt (based on the weight of Pt catalyst) in xylene.

The following materials are all available from Dow Silicones Corporation:

Hydride polydimethylsiloxane (PDMS) has the structure of $(CH_3)_3SiO—[(CH_3)_2SiO]_{3.34}—[HCH_3SiO]_{5.32}—Si(CH_3)_3$.

Vinyl terminated PDMS has the structure of $CH_2═CH—(CH_3)$ 2 $SiO—[(CH_3)_2SiO]_m—Si(CH_3)_2—CH═CH_2$, where m is 162, 324, 41, 554 for vinyl terminated PDMS-A, vinyl terminated PDMS-B, vinyl terminated PDMS-C and vinyl terminated PDMS-D, respectively.

Vinyl capped MQ resin has an average chemical structure: $M^{Vi}_{0.05}M_{0.4}Q_{0.55}$ with a Vi content of 5 mol % and 1.8 wt % (mole content and weight contents of Vi groups are as defined in the polyorganosilicate resin section above), where M vi denotes $CH_2═CH(CH_3)_2SiO_{1/2}$ and Vi denotes $CH_2═CH—$.

DOWSIL™ 193C Fluid ("DC-193C SPE") is a silicone modified polyether ($M_n$: 3,096 g/mol as determined by GPC below, DOWSIL is a trademark of Dow Silicones Corporation).

Adhesion promoter is a combination of glycidoxypropyltrimethoxysilane and hydroxy-terminated methylvinyl/dimethylsiloxane copolymer.

Polyols given in the below table are all available from The Dow Chemical Company:

| Polyols | Abbreviation | Product/Chemical description[3] | $Mn^2$, g/mol | $OHV^1$, mg KOH/g |
|---|---|---|---|---|
| CARBOWAX ™ polyethylene glycol 200 | PEG 200 | polyethylene glycol | 200 | 535-590 |
| CARBOWAX ™ polyethylene glycol 600 | PEG 600 | polyethylene glycol | 600 | 178-197 |
| Polyglycol P-400 E | P400 PPG | polypropylene glycol | 400 | N/A |
| Polyglycol P-1000 E | P1000 PPG | polypropylene glycol | 1,000 | N/A |
| Polyglycol P 2000 | P2000 PPG | polypropylene glycol | 2,000 | 54.8-57.4 |
| Polyglycol P 4000 | P4000 PPG | polypropylene glycol | 4,000 | N/A |
| TERGITOL ™ L-61 surfactant | L-61 EO/PO | alcohol alkoxylate (PO: 90 wt %, linear structure) | 2,000 | N/A |
| DOWFAX ™ DF-103 defoamer | DF-103 EO/PO | alcohol alkoxylate (PO: 90 wt %, glycerol initiated) | 3,000 | 54.9-58.1 |
| DOWFAX DF-162 nonionic surfactant | DF-162 EO/PO | alcohol alkoxylate (PO: 94 wt %, sorbitol initiated) | 9,600 | 30-36 |
| DOWFAX DF-163 nonionic surfactant | DF-163 EO/PO | alcohol alkoxylate (PO: 57 wt %, sorbitol initiated) | 12,000 | N/A |

[1]OHV represents hydroxyl value of the alcohol alkoxylate determined by ASTM D4274-2011; N/A—not available;
[2]Mn is calculated by 56100 (mg/mol)*f/OHV (mgKOH/g);
[3]wt % of PO refers to weight content of the propylene oxide unites relative to the total weight of the alcohol alkoxylate.
CARBOWAX, TERGITOL and DOWFAX are trademarks of The Dow Chemical Company.

The following standard analytical equipment and methods are used in the Examples and in determining the properties and characteristics stated herein:

NMR $^{29}Si$ and $^{13}C$ nuclear magnetic resonance (NMR) technique described in U.S. Pat. No. 9,593,209, Reference Example 2 at col. 32 was used to measure the mole percentage of methyl, weight content of silicon-bonded hydrogen atoms, silicon-bonded hydroxyl content, molar ratios of M ($R^M{}_3SiO_{1/2}$) and Q ($SiO_{4/2}$) units, and molar percentage and weight percentage of alkenyl (e.g., vinyl) groups described above.

GPC

Number average molecular weight (M n) of silicone modified polyethers was determined using GPC analysis. The chromatographic equipment consisted of a Waters 2695 Separations Module equipped with a vacuum degasser, and a Waters 2414 refractive index detector. The separation was made with three Styragel™ HR columns (300 millimeter (mm)×7.8 mm) (molecular weight separation range of 100 to 4,000,000), preceded by a Styragel™ guard column (30 mm×4.6 mm), Styragel is a trademark of Waters Technologies Corporation. The analyses were performed using certified grade tetrahydrofuran (THF) flowing at 1.0 milliliter per minute (mL/min) as the eluent, and the columns and detector were both heated to 35° C. 1.0% wt./v sample was prepared by weighing 0.050 g into a glass vial (8 mL) and diluting with 5 mL THF. Sample solution was transferred to a glass autosampler vial after filtered through 0.45 μm polytetrafluoroethylene (PTFE) filter. An injection volume of 100 microliters (μL) was used and data was collected for 37 minutes. Data collection and analyses were performed using Waters Empower GPC software. Molecular weight averages were determined relative to a calibration curve (3 rd order) created using polystyrene standards covering the molecular weight range of 474-1,270,000.

Volume Resistivity (VR)

A silicone composition was casted into a mold (20 mm*6 mm*0.4 mm (thickness)) on a glass slide and cured at 150° C. for 2 hours to form cured samples. The cured samples were placed at room temperature for 12 hours prior to VR testing. The volume resistivity of the cured samples was measured by a 4-probe volume resistivity tester (ST2253) from Suzhou Jingge Electronic Co., Ltd. (China), in accordance with GB/T 1552-1995.

The as prepared cured samples on the glass slide were placed under the 4-probe VR tester and an initial VR of the samples was measured, denoted as $VR_{initial}$. The samples were then put into an oven for heat aging at 125° C. for a certain time period (20-60 days), followed by cooling to room temperature for more than 12 hours. VR of the samples after heat aging was measured, denoted as $VR_{Aging}$. The variation of VR before and after heat aging, denoted as $VR_{Variation}$, is calculated based on the following equation:

$$VR_{Variation}=(VR_{Aging}-VR_{Initial})/VR_{Initial}*100\%$$

Median Particle Size of Electrically Conductive Fillers

Determine median particle size, i.e., D50 particle size, of fillers using Laser Diffraction particle size analyzer from Beckman Coulter (Model LS 13 320) by determining the volume weighted particle size distribution of $10^8$ particles.

Complex Viscosity

All components of a silicone composition were mixed together. Within two hours, complex viscosities of the resulting silicone composition were measured between 25 parallel crosshatch plate with a TA DHR-III Rheometer (TA Instruments) using oscillation frequency sweep and Cox-merz transformation at a strain of 1% and an angular frequency of 0.1 radian per second (rad/s) at room temperature. Silicone compositions are categorized based on the measured complex viscosities as follows, "Powdery" represents viscosities>550,000 Pa·s, "Gum" represents viscosities in the range of >350,000 to 550,000 Pa·s, "Paste" represents viscosities in the range of >10,000 to 350,000 Pa·s, and "Viscous" represents viscosities in the range of 1,000 to 10,000 Pa·s.

Shelf Life

Determine shelf life of a silicone composition by first admixing all components in the silicone composition, and then storing the resulting silicone composition at room temperature for 3 months. The appearance of the silicone composition before and after storage were observed and recorded, respectively. If no oil-like liquid showing on the surface of the silicone composition (i.e., no bleeding or no glossy surface) after storage is observed by the naked eye, the silicone composition is stable. Otherwise, if the silicone composition after storage shows glossy surface, the silicone composition is not stable.

Inventive Examples (IEs) 1-22 and Comparative Exs (CE) 1-20 Silicone Compositions Preparation of Premix S-1: all ingredients in Premix S-1 listed in Table 1-1 were added into a polypropylene (PP) bottle and mixed by using a dental mixer at 3,000 revolutions per minute (rpm) for 30 seconds twice to give Premix S-1.

Premix S-2 (S-2) was prepared according to the same procedure as preparation of Premix S-1 above, based on ingredients listed in Table 1-2.

Then certain amounts of the as prepared Premix S-1 or Premix S-2 were loaded into separate bottles and mixed with other ingredients in silicone compositions given in Tables 2-7 using a dental mixer at 2,000 rpm for 1 minute under vacuum to give silicone compositions. The obtained silicone compositions were evaluated for viscosities and VR performance according to the test methods described above and results are given in Tables 2-7.

TABLE 1-1

| Premix S-1 | |
|---|---|
| Raw materials | wt %* |
| Hydride PDMS | 6 |
| Vinyl capped MQ resin | 13.95 |
| Vinyl terminated PDMS-B | 32.40 |
| Vinyl terminated PDMS-A | 46.2 |
| Pt catalyst | 0.4 |
| Inhibitor A | 0.2 |
| Adhesion promoter | 0.85 |
| TOTAL | 100 |

*wt % refers to weight percentage relative to the total weight of Premix S-1.

TABLE 1-2

| Premix S-2 | |
|---|---|
| Raw materials | wt %* |
| Vinyl terminated PDMS-C | 24.50 |
| Vinyl terminated PDMS-D | 71.99 |
| Hydride PDMS | 2.88 |
| ETCH (inhibitor) | 0.21 |
| Pt catalyst | 0.42 |
| TOTAL | 100 |

*wt % refers to weight percentage relative to the total weight of Premix S-2.

As shown in Table 2, the silicone compositions of IEs 1-4 all showed desired viscosities. In contrast, the silicone composition of CE1 showed an undesirably high complex viscosity and appeared like gum. The silicone compositions of IEs 1-4 provided cured products made therefrom with much better electrical conductivity as indicated by lower VR than CEs 1-5. Particularly, the silicone compositions of IEs 1-4, upon curing, showed a hundred fold decrease in VR as compared to CE1, and showed VR decreases by more than 50% of the VR of cured products comprising PPG having M n of 1,000 g/mol (CE4).

TABLE 2

| Silicone compositions and VR performance | | | | | | | | | |
|---|---|---|---|---|---|---|---|---|---|
| Ingredients, weight part | CE1 | CE2 | CE3 | CE4 | CE5 | IE1 | IE2 | IE3 | IE4 |
| Premix S-1 | 12 | 12 | 12 | 12 | 12 | 12 | 12 | 12 | 12 |
| SN08P40 | 88 | 88 | 88 | 88 | 88 | 88 | 88 | 88 | 88 |
| PEG 200 | | 0.3 | | | | | | | |
| P400 PPG | | | 0.3 | | | | | | |
| P1000 PPG | | | | 0.3 | | | | | |
| L-61 EO/PO | | | | | 0.3 | | | | |
| P4000 PPG | | | | | | 0.3 | | | |
| DF-103 EO/PO | | | | | | | 0.3 | | |
| DF-162 EO/PO | | | | | | | | 0.3 | |
| DF-163 EO/PO | | | | | | | | | 0.3 |
| Complex viscosity/Appearance | gum | paste | paste | paste | paste | paste | viscous | viscous | viscous |
| $VR_{Initial}$ (mΩ · cm) | 64.5 | 16.7 | 1.81 | 1.36 | 0.779 | 0.464 | 0.588 | 0.368 | 0.403 |

mΩ · cm denotes milliohm-centimeter.

As shown in Table 3, the silicone compositions of IEs 2-4 upon curing provided much less VR variation, as compared to the composition of CE1 lacking any polymer additive, or the compositions of CEs 3 and 6-7 comprising P400 PPG, PEG 600 and SPE, respectively.

TABLE 3

| Silicone compositions and VR variation after heat aging | | | | | | | |
|---|---|---|---|---|---|---|---|
| Ingredients, weight part | CE1 | CE3 | CE6 | CE7 | IE2 | IE3 | IE4 |
| Premix S-1 | 12 | 12 | 12 | 12 | 12 | 12 | 12 |
| SN08P40 | 88 | 88 | 88 | 88 | 88 | 88 | 88 |
| PEG 600 | | | 0.3 | | | | |
| P400 PPG | | 0.3 | | | | | |
| DC-193C SPE | | | | 0.3 | | | |
| DF-103 EO/PO | | | | | 0.3 | | |
| DF-162 EO/PO | | | | | | 0.3 | |
| DF-163 EO/PO | | | | | | | 0.3 |
| $VR_{Aging}$ (mΩ · cm), 125° C./30 days | N.C. | 7.10 | 2.44 | 1640 | 1.07 | 0.554 | 0.527 |
| $VR_{Variation}$, 125° C./30 days | N.C. | 292% | 309% | 58342% | 81.9% | 50.51% | 30.82% |
| $VR_{Aging}$ (mΩ · cm), 125° C./60 days | N.C. | 18.5 | 5.16 | 7330 | 1.78 | 0.877 | 0.799 |
| $VR_{Variation}$, 125° C./60 days | N.C. | 922% | 765% | 261127% | 202% | 138% | 98.4% |

N.C.—No conductivity

As shown in Table 4, the silicone compositions of IEs 5-10 all showed desired viscosities. In contrast, the silicone composition of CE8 showed an undesirably high complex viscosity and appeared as gum. The silicone compositions of IEs 5 and 8 provided cured products made therefrom with much better electrical conductivity than that of CE8, as indicated by VR decreases by more than 70% of the VR of cured products made from CE8. The silicone compositions of IEs 6 and 9 provided much better electrical conductivity than that of CE9, as indicated by VR decreases by more than 80% of the VR of cured products made from CE9. The silicone compositions of IE7 and IE10 provided much better electrical conductivity than that of CE10, as indicated by VR decreases by more than 99% of the VR of cured products made from CE10. The silicone compositions of IEs 5-10 upon curing also provided much better electrical conductivity than those of CE11 and CE12.

TABLE 4

| Silicone compositions and VR performance | | | | | | | | | | | |
|---|---|---|---|---|---|---|---|---|---|---|---|
| Ingredients, weight part | CE8 | CE9 | CE10 | IE5 | IE6 | IE7 | IE8 | IE9 | IE10 | CE11 | CE12 |
| Premix S-2 | 11.8 | 15.5 | 16.7 | 11.8 | 15.5 | 16.7 | 11.8 | 15.5 | 16.7 | 11.8 | 11.8 |
| SN40P18 | 88.2 | 84.5 | 83.3 | 88.2 | 84.5 | 83.3 | 88.2 | 84.5 | 83.3 | 88.2 | 88.2 |
| PEG 200 | | | | | | | | | | 0.3 | |
| P400 PPG | | | | | | | | | | | 0.3 |
| DF-162 EO/PO | | | | 0.3 | 0.4 | 0.4 | | | | | |
| DF-163 EO/PO | | | | | | | 0.3 | 0.4 | 0.4 | | |
| Complex viscosity/Appearance | gum | paste | viscous | paste | viscous | viscous | paste | viscous | viscous | paste | paste |
| $VR_{Initial}$ (mΩ · cm) | 4.6 | 10.3 | 7601335 | 1.15 | 1.24 | 1.43 | 1.17 | 1.11 | 1.33 | 3.34 | 3.64 |

As shown in Table 5, the silicone compositions of IE 9 upon curing provided much less VR variation as compared to CE9 lacking any polymer additive or CE14 containing SPE. The silicone compositions of IE11 and IE12 upon curing also provided much less VR variation as compared to CE13 lacking any polymer additive.

TABLE 5

| Silicone compositions and VR performance | | | | | | |
|---|---|---|---|---|---|---|
| Ingredients, weight part | CE13 | CE9 | CE14 | IE9 | IE11 | IE12 |
| Premix S-1 | 12 | | | | 12 | 12 |
| Premix S-2 | | 15.5 | 15.5 | 15.5 | | |
| SN40P18 | 88 | 84.5 | 84.5 | 84.5 | 88 | 88 |
| DC-193C SPE | | | 0.4 | | | |
| DF-162 EO/PO | | | | | 0.3 | |
| DF-163 EO/PO | | | | 0.4 | | 0.3 |
| $VR_{Initial}$ (mΩ · cm) | 22.7 | 10.3 | 1.65 | 1.11 | 0.678 | 0.598 |
| $VR_{Aging}$ (mΩ · cm), 125° C./30 days | 148 | 128 | 62.3 | 6.4 | 1.96 | 2.01 |
| $VR_{Variation}$, 125° C./30 days | 552% | 1148% | 3683% | 475% | 189% | 236% |

As shown in Table 6, the silicone compositions of IEs 13-18 all showed desired viscosities. Moreover, after storing at room temperature for 3 months, the silicone composition of CE16 showed significant bleeding (i.e., glossy surface), while no bleeding was observed for the silicone composition with the same filler loading (IE14 and IE17).

The silicone compositions of IEs 13 and 16 provided cured products made therefrom with VR decreases by more than 75% of the VR of cured products made from CE15. The silicone compositions of IEs 14 and 17 provided cured products made therefrom with VR decreases by more than 50% of the VR of cured products made from CE16. The silicone compositions of IEs 15 and 18 provided cured products made therefrom with VR decreases by more than 99% of the VR of cured products made from CE17. It indicates that the silicone compositions of IEs 13 and 16, IEs 14 and 17, IEs 15 and 18 provided cured products made therefrom with much better initial electrical conductivity than that of CE15, CE 16, and CE17, respectively. In addition, the silicone compositions of IE13 and IE16 upon curing provided much less VR variation than CE15, and IE16 provided even less VR variation than IE13.

TABLE 6

| Silicone compositions and VR performance | | | | | | | | | |
|---|---|---|---|---|---|---|---|---|---|
| Ingredient, weight part | CE15 | CE16 | CE17 | IE13 | IE14 | IE15 | IE16 | IE17 | IE18 |
| Premix S-2 | 18.4 | 24.5 | 27.3 | 18.4 | 24.5 | 27.3 | 18.4 | 24.5 | 27.3 |
| S3000S3N | 81.6 | 75.5 | 72.7 | 81.6 | 75.5 | 72.7 | 81.6 | 75.5 | 72.7 |
| DF-162 EO/PO | | | | 0.5 | 0.6 | 0.7 | | | |
| DF-163 EO/PO | | | | | | | 0.5 | 0.6 | 0.7 |
| Complex viscosity/Appearance | paste | viscous | viscous | viscous | viscous | viscous | viscous | viscous | viscous |
| $VR_{Initial}$ (mΩ · cm) | 13.3 | 5.49 | 7930553 | 2.81 | 2.52 | 2.90 | 2.04 | 2.50 | 3.47 |
| $VR_{Aging}$ (mΩ · cm), 125° C./30 days | 645 | N/A | N/A | 35.7 | N/A | N/A | 15.9 | N/A | N/A |
| $VR_{Variation}$, 125° C./30 days | 4762% | N/A | N/A | 1170% | N/A | N/A | 679% | N/A | N/A |

N/A—Not available

As shown in Table 7, the silicone compositions of IEs 19-22 all showed desired viscosities. Moreover, after storing at room temperature for 3 months, the silicone composition of CE19 showed significant bleeding (i.e., glossy surface), while no bleeding was observed for the silicone composition with DF-163 at the same filler loading (IE20).

The silicone compositions of IE19 and IE22 provided VR decreases by more than 60% as compared with CE18. The cured products made from IE20 showed a VR decrease by 65% of the VR of cured products made from CE19, and the cured product made from IE21 provided a VR decrease by 99% of the VR of cured products made from CE20. It indicates the silicone compositions of IEs 19 and 22, IE20, and IE21 provided cured products made therefrom with much better initial electrical conductivity as compared to those of CE18, CE19, and CE20, respectively. In addition, the silicone compositions of IE19 and IE22 upon curing provided much less VR variation than CE18, which indicates better retention of electrical conductivity than CE18.

TABLE 7

Properties of silicone compositions and cured products made therefrom

| Ingredient, weight part | CE18 | CE19 | CE20 | IE19 | IE20 | IE21 | IE22 |
|---|---|---|---|---|---|---|---|
| Premix S-2 | 18.4 | 27.3 | 33.3 | 18.4 | 27.3 | 33.3 | 18.4 |
| SA300S20 | 81.6 | 72.7 | 66.7 | 81.6 | 72.7 | 66.7 | 81.6 |
| DF-163 EO/PO | | | | 0.5 | 0.7 | 0.8 | |
| DF-162 EO/PO | | | | | | | 0.5 |
| Complex viscosity/Appearance | paste | viscous | viscous | viscous | viscous | viscous | viscous |
| $VR_{Initial}$ (mΩ · cm) | 3.52 | 5.72 | 15229690 | 1.09 | 1.96 | 5.06 | 1.24 |
| $VR_{Aging}$ (mΩ · cm), 125° C./20 days | 3913 | N/A | N/A | 16.8 | N/A | N/A | 47.4 |
| $VR_{Variation}$, 125° C./20 days | 111121% | N/A | N/A | 1447% | N/A | N/A | 3726% |

N/A—Not available

What is claimed is:

1. A silicone composition comprising, by weight based on the total weight of the silicone composition;

(A) from 66% to 89% of an electrically conductive filler;

(B) from 5% to 40% of a polydiorganosiloxane polymer of formula (I),

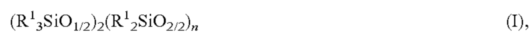

$(R^1_3SiO_{1/2})_2(R^1_2SiO_{2/2})_n$ (I), where each $R^1$ is independently a monovalent aliphatic hydrocarbon group, n is in the range of from 35 to 1,000, and the polydiorganosiloxane polymer contains an average of at least two alkenyl groups per molecule;

(C) a polyorganohydrogensiloxane of formula (II),

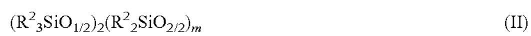

$(R^2_3SiO_{1/2})_2(R^2_2SiO_{2/2})_m$ (II)

where each $R^2$ is independently hydrogen or an alkyl group having from 1 to 20 carbon atoms, m is in the range of from 5 to 200, and the polyorganohydrogensiloxane has an average of at least three silicon-bonded hydrogen atoms per molecule;

(D) a hydrosilylation reaction catalyst;

(E) from 0.1% to 1.5% of a polymer additive having a molecular weight of greater than 2,000 to 20,000 g/mol, wherein the polymer additive is selected from the group consisting of a polypropylene glycol, an alcohol initiated ethylene oxide and propylene oxide copolymer, or mixtures thereof; and (F) from zero to 0.3% of a hydrosilylation reaction inhibitor.

2. The silicone composition of claim 1, wherein component (E) comprises the alcohol initiated ethylene oxide and propylene oxide copolymer and wherein the copolymer has the structure of formula (III):

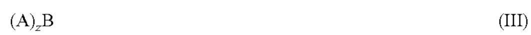

$(A)_zB$ (III)

where A represents HO—(CHR$^p$—CHR$^q$—O)$_x$—(CH$_2$—CH$_2$—O)$_y$—, wherein x is from 8 to 40, y is from 1 to 20, and $R^p$ and $R^q$ are different and selected from hydrogen and —$CH_3$; z is from 1 to 12; and B is hydrogen or a monovalent, bivalent, or multivalent hydrocarbon group having from 3 to 18 carbon atoms.

3. The silicone composition of claim 1, wherein component (E) comprises the alcohol initiated ethylene oxide and propylene oxide copolymer and wherein the copolymer comprises from 50% to 99% of propylene oxide units, by weight based on the weight of the copolymer.

4. The silicone composition of claim 1, wherein component (E) comprises the alcohol initiated ethylene oxide and propylene oxide copolymer and wherein the copolymer has a molecular weight of from 3,000 to 14,000 g/mol.

5. The silicone composition of claim 1, wherein the electrically conductive filler (A) comprises particles consisting of silver or alloys thereof, silver coated nickel particles, silver coated glass particles, silver coated aluminum particles, silver coated copper particles, or mixtures thereof.

6. The silicone composition of claim 1, wherein, in formula (I), n is from 35 to 500 and at least 50 mol % of the monovalent aliphatic hydrocarbon group represented by $R^1$ is methyl.

7. The silicone composition of claim 1, wherein the polyorganohydrogensiloxane (C) contains the silicon-bonded hydrogen atoms in an amount of from 0.38% to 2%, by weight based on the weight of the polyorganohydrogensiloxane (B).

8. The silicone composition of claim 1, wherein the hydrosilylation reaction catalyst (D) comprises platinum.

9. The silicone composition of claim 1, wherein the molar ratio of silicon-bonded hydrogen atoms in the polyorganohydrogensiloxane (C) to alkenyl groups in all components of the silicone composition is from 0.5 to 10.

10. The silicone composition of claim 1, further comprising a polyorganosilicate resin consisting essentially of $R^M_3SiO_{1/2}$ units and $SiO_{4/2}$ units wherein each $R^M$ is independently alkyl or alkenyl, wherein the polyorganosilicate resin contains an average of from 3 mol % to 20 mol % of alkenyl groups.

11. The silicone composition of claim 1, further comprising an adhesion promoter.

12. The silicone composition of claim 11, wherein the adhesion promoter is selected from glycidoxypropyltrimethoxysilane, a hydroxy-terminated, vinyl functional polydimethylsiloxane, or a combination thereof.

13. A process for preparing the silicone composition of claim 1, comprising admixing the electrically conductive filler (A), the polydiorganosiloxane polymer (B), the polyorganohydrogensiloxane (C), the hydrosilylation reaction catalyst (D), the polymer additive (E), and optionally the hydrosilylation reaction inhibitor (F) if used.

14. A silicone adhesive comprising a cured product of the silicone composition of claim 1.

15. The silicone composition of claim 1, wherein component (F) is present.

* * * * *